(12) United States Patent
Robertsson et al.

(10) Patent No.: US 9,075,163 B2
(45) Date of Patent: *Jul. 7, 2015

(54) INTERFEROMETRIC SEISMIC DATA PROCESSING

(75) Inventors: Johan O. A. Robertsson, Grantchester (GB); James Rickett, Cambridge (GB)

(73) Assignee: WESTERNGECO L.L.C., Houston, TX (US)

(*) Notice: Subject to any disclaimer, the term of this patent is extended or adjusted under 35 U.S.C. 154(b) by 633 days.

This patent is subject to a terminal disclaimer.

(21) Appl. No.: 12/425,888

(22) Filed: Apr. 17, 2009

(65) Prior Publication Data

US 2010/0265797 A1    Oct. 21, 2010

(51) Int. Cl.
*G01V 1/00* (2006.01)
*G01V 1/36* (2006.01)

(52) U.S. Cl.
CPC .......... *G01V 1/366* (2013.01); *G01V 2210/675* (2013.01)

(58) Field of Classification Search
CPC .................. G01V 1/366; G01V 2210/675
USPC .............................. 367/38, 43, 73
See application file for complete search history.

(56) References Cited

U.S. PATENT DOCUMENTS

| | | | |
|---|---|---|---|
| 8,737,165 B2 * | 5/2014 | Halliday et al. | 367/21 |
| 2003/0050759 A1 | 3/2003 | Srnka et al. | |
| 2005/0088913 A1 * | 4/2005 | Lecomte | 367/51 |
| 2005/0190649 A1 * | 9/2005 | Eisner et al. | 367/38 |
| 2006/0253759 A1 | 11/2006 | Wei | |
| 2007/0104028 A1 * | 5/2007 | Van Manen et al. | 367/38 |
| 2008/0130411 A1 | 6/2008 | Brandsberg-Dahl et al. | |
| 2008/0285383 A1 * | 11/2008 | An | 367/38 |
| 2010/0265797 A1 | 10/2010 | Robertsson et al. | |

FOREIGN PATENT DOCUMENTS

GB    2438978    12/2007

OTHER PUBLICATIONS

Halliday, et al., Interferometric Surface-Wave Isolation and Removal, Geophysics, Sep.-Oct. 2007, pp. A69-A73, vol. 72, No. 5.
Kamae, et al., A Technique for Simulating Strong Ground Motion using Hybrid Green's Function, Bulletin of the Seismological Society of America, 1998, pp. 357-367, vol. 88, No. 2.

(Continued)

Primary Examiner — Krystine Breier (57) ABSTRACT

Implementations of various technologies for a method for generating a seismic image of a subsurface are described herein. Seismic data may be received from two sensors in a seismic survey. The seismic data below and equal to a predetermined frequency may be classified as low-frequency seismic data. The low-frequency seismic data may be re-sampled based on the predetermined frequency. A set of low-frequency Green's functions may be calculated using interferometry on the re-sampled low-frequency seismic data. High-frequency seismic data of the seismic data may be processed to create a set of high-frequency Green's functions at one or more source locations of the seismic survey. The set of high-frequency Green's functions may be merged with the set of low-frequency Green's functions to create a set of broad-band Green's functions. The seismic image may be generated using the set of broad-band Green's functions at the source locations.

21 Claims, 4 Drawing Sheets

(56) References Cited

OTHER PUBLICATIONS

PCT Search Report, dated Aug. 13, 2010, Application No. PCT/US2010/027090.

Extended European Search Report of European Application No. 10764796.8 dated Oct. 16, 2013: pp. 1-6.

Curtis et al., "Seismic interferometry-turning noise into signal," The Leading Edge, Sep. 2006: pp. 1085-1092.

Halliday et al., "Seismic surface waves in a suburban environment: Active and passive interferometric methods," The Leading Edge, Feb. 2008: pp. 210-218.

Snieder, "Extracting the Green's function from the correlation of coda waves: A derivation based on stationary phase," Physical Review E, 2004, vol. 69: pp. 046610-1 - 046610-8.

Draganov et al., "Retrieval of reflections from seismic background-noise measurements," Geophysical Research Letters, 2007, vol. 34: pp. 144-147.

Search and Examination Report of GC Application No. GC 2010-15543 dated Sep. 26, 2013: pp. 1-5.

* cited by examiner

INTERFEROMETRIC SEISMIC DATA PROCESSING

BACKGROUND

1. Field of the Invention

Implementations of various technologies described herein generally relate to methods and systems for processing seismic data.

2. Description of the Related Art

The following descriptions and examples are not admitted to be prior art by virtue of their inclusion within this section.

Seismic data signals are typically acquired by measuring and recording data during a seismic survey. A seismic survey may be performed by repeatedly firing an impulsive seismic energy source at the surface of the earth, sea or seafloor and recording the received signals at a set of sensors. The sensors may typically be situated at the same surface as the source, but laterally displaced on regular grid positions. However, there may be situations where a non-regular distribution of the sensors is preferred or where the source and the sensors may be positioned at different depth levels. In a typical seismic survey, the source and the sensors may be displaced at fixed intervals (e.g., 25 meters) and in a certain direction (e.g., the "inline" direction).

During the seismic survey, the cycle of firing the source and recording the received signals may be repeated a plurality of times. When firing the seismic source, a pressure wave may be excited and propagated into the subsurface. The pressure wave reflects off interfaces between various earth layers (such as rock, sand, shale, and chalk layers) and propagates upwardly to the set of sensors, where the particle velocity of the wave vibrations or the pressure oscillations of the wave may be measured and recorded.

However, acquiring low-frequency seismic data may be difficult. One approach involves using vibroseis sources that are configured to emit a source spectrum that is richer in lower frequencies than typical seismic sources. However, the low-frequency output from vibroseis sources is limited by the size of the vibroseis, and its sweep time.

SUMMARY

Described herein are implementations of various technologies for a method for processing seismic data. In one implementation, the method includes receiving the seismic data from two sensors in a seismic survey, classifying the seismic data below and equal to a predetermined frequency as low-frequency seismic data, calculating a set of low-frequency Green's functions using interferometry on the low-frequency seismic data, processing high-frequency seismic data of the seismic data to create a set of high-frequency Green's functions at one or more source locations of the seismic survey, merging the set of low-frequency Green's functions and the set of high-frequency Green's functions to create a set of broad-band Green's functions at the source locations, and generating a seismic image using the set of broad-band Green's functions.

In another implementation, the method includes receiving the seismic data from two sensors in a seismic survey, classifying the seismic data above and equal to a predetermined frequency as high-frequency seismic data and below and equal to the predetermined frequency as low-frequency seismic data, re-sampling the low-frequency seismic data based on the predetermined frequency, calculating a set of low-frequency Green's functions using interferometry on the re-sampled low-frequency seismic data, processing the high-frequency seismic data to form a set of high-frequency Green's functions at one or more source locations of the seismic survey, merging the set of low-frequency Green's functions with the set of high-frequency Green's functions to generate a set of broad-band Green's functions at the source locations, and inverting for one or more subsurface parameters using the set of broad-band Green's functions.

In yet another implementation, the method includes receiving seismic data obtained through continuous recording for the seismic data and surrounding noise by one or more seismic sensors, classifying, using a low pass filter, the seismic data above and equal to a predetermined frequency as high-frequency seismic data and below and equal to the predetermined frequency as low-frequency seismic data, re-sampling the low-frequency seismic data based on the predetermined frequency, attenuating ground roll and surface waves in the re-sampled low-frequency seismic data, calculating a set of low-frequency Green's functions using interferometry on the attenuated low-frequency seismic data, indexing the high-frequency seismic data by one or more sources of the high-frequency seismic data to generate an active source seismic dataset, and generating a seismic image using the active source seismic dataset and the set of low-frequency Green's functions at one or more locations of the seismic sensors.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a system for processing seismic data. Seismic data may be collected using active and passive surveying of a subsurface region. The passive surveying may record seismic activity continuously and particularly including periods between source firings in the active survey. Generally, the passive surveying enables recording of low-frequency seismic response, while the active surveying may record high-frequency seismic data. However, there is some overlap in the frequencies.

The seismic data may be split between the high and low-frequencies, typically using a 4-5 Hz threshold to distinguish the frequencies. Ground roll and surface waves may be attenuated in the low-frequency seismic data. A set of low-frequency Green's functions may then be calculated by applying cross-correlations between sensor locations on the attenuated data.

A set of high-frequency Green's functions may be generated for the high-frequency seismic data. The sets of low-frequency and high-frequency Green's functions may be merged to generate a broad-band set of Green's functions. The broad-band set of Green's functions may be input to a full waveform inversion procedure to generate a seismic image of the subsurface region.

One or more implementations of various techniques for processing interferometric seismic data will now be described in more detail with reference to FIGS. 1-4 in the following paragraphs.

Figure 1:
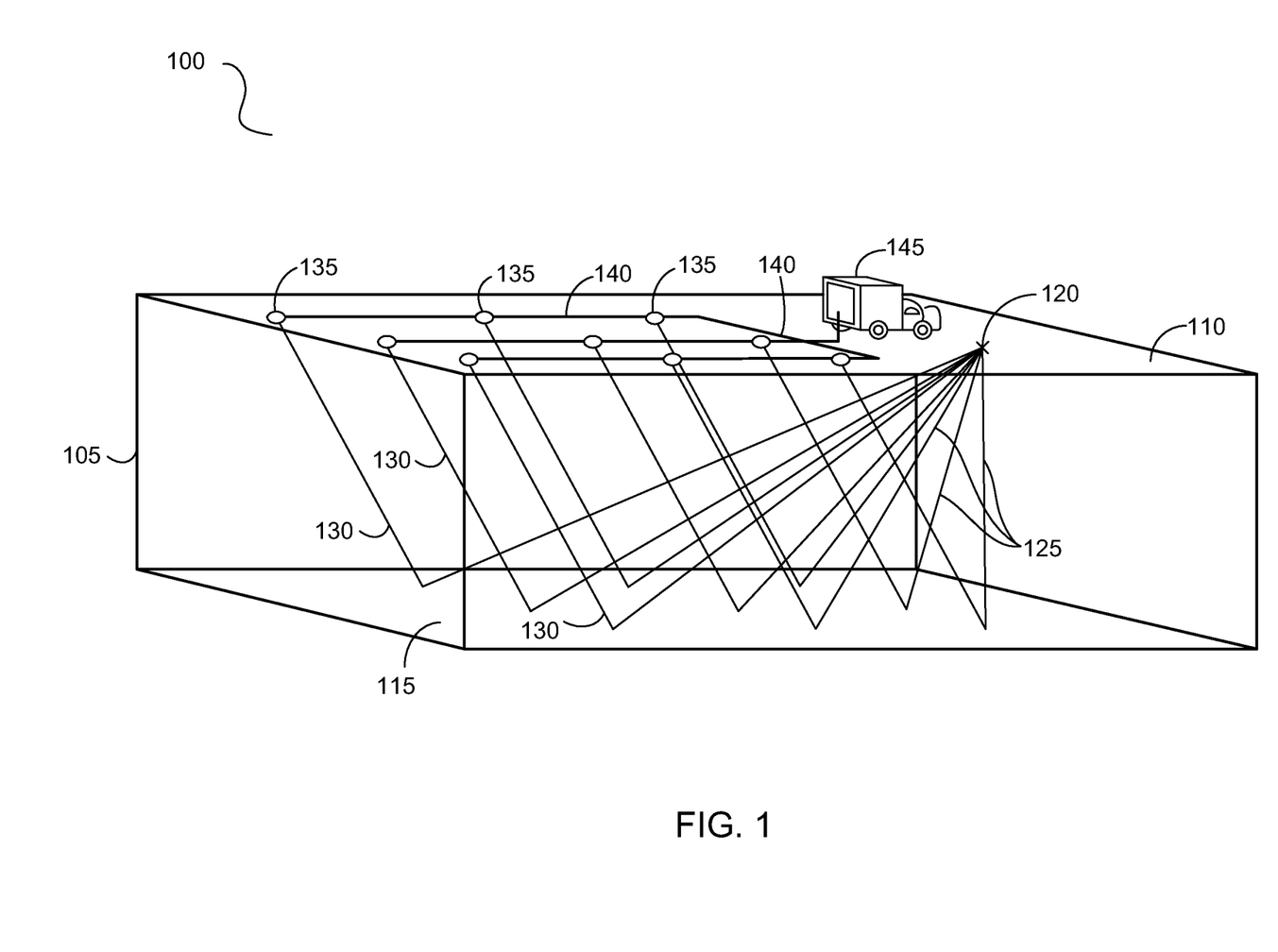
FIG. 1 illustrates a land-based survey of a subterranean subsurface in accordance with one or more implementations of various techniques described herein.

FIG. 1 illustrates a land-based survey 100 of a subterranean subsurface 105 in accordance with one or more implementations of various techniques described herein. The subsurface 105 includes the surface 110 and a reflector 115. The geological survey 100 may include active and passive surveying.

During active surveying, an elastic source 120 may fire elastic waves 125 (only three are indicated) into the subsurface 105. The elastic waves 125 may include a compressional wave ("P-wave") and a shear wave ("S-wave"), neither of which are shown. The component(s) of the elastic wave 125 may be reflected and converted by the reflector 115, and the reflections 130 (only three indicated) may be received by a plurality of seismic sensors 135 (only three indicated).

The reflections 130 may be low-frequency waves. In seismic surveying, frequencies at or below 5 Hz are typically considered low-frequency.

The seismic sensors 135 may generate electrical signals (not shown) representative of the received reflections 130. The electrical signals may be embedded with information regarding the subsurface 105. The electrical signals may be transmitted over the lines 140 to a recording truck 145, where the electrical signals may be captured as a record of seismic data. Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by each of the seismic sensors.

Further, not all of the elastic waves propagate downward into the geological formation. Some of the elastic waves are interface waves (not shown) that propagate along an interface between two media instead of through a medium. An interface wave can travel at the interface between the earth and air—e.g., surface waves—or the earth and a body of water—e.g., Scholte waves—for instance. Surface waves may create in the seismic data what is known as ground roll. Ground roll is a type of coherent noise generated by a surface wave that can obscure signals reflected from the reflector 115 and degrade overall quality of the seismic data resulting from the survey.

Surface waves may be high-frequency waves, generated by the source 120. However, surface waves may be predominantly generated by noise from the surrounding environment. For example, surrounding noise may come from natural phenomena, such as earthquakes and the ocean. Surrounding noise may also come from human activity, such as road traffic, drilling, and the like.8

Passive surveying may be configured to record seismic data continuously while active surveying is taking place. Active surveying typically takes place over a number of days. However, even when the source 120 is not firing, the sensors 135 may still record seismic data generated by the surrounding noise. In this manner, the passive surveying may record seismic data resulting from the surrounding noise. The surrounding noise may include ground roll, body waves, and reflections from structures within the subsurface 105.

These reflections may represent noise due to earthquakes, the oceans, environmental noise, and the like. While these reflections may provide relevant seismic information about the subsurface 105, the ground roll may represent undesirable noise.

Typically, in seismic surveying, waves at around 5 Hz are considered to be low-frequency. Advantageously, by performing passive surveying, 5 Hz may be treated as a high-frequency wavelength in implementations of the various techniques described herein.

In implementations of the various techniques described herein, the seismic survey 100 may be a subsea survey or conducted in transitional zones between land and water. The information embedded in the electrical signals that are generated by the seismic sensors may also, in some implementations, be transmitted wirelessly. Once captured, the record of seismic data may be processed in accordance with various implementations described herein.

In one implementation, the seismic data may be processed to generate a seismic image of the subsurface 105. In another implementation, the seismic data may be processed to generate a velocity model of the subsurface 105.

Figure 2:
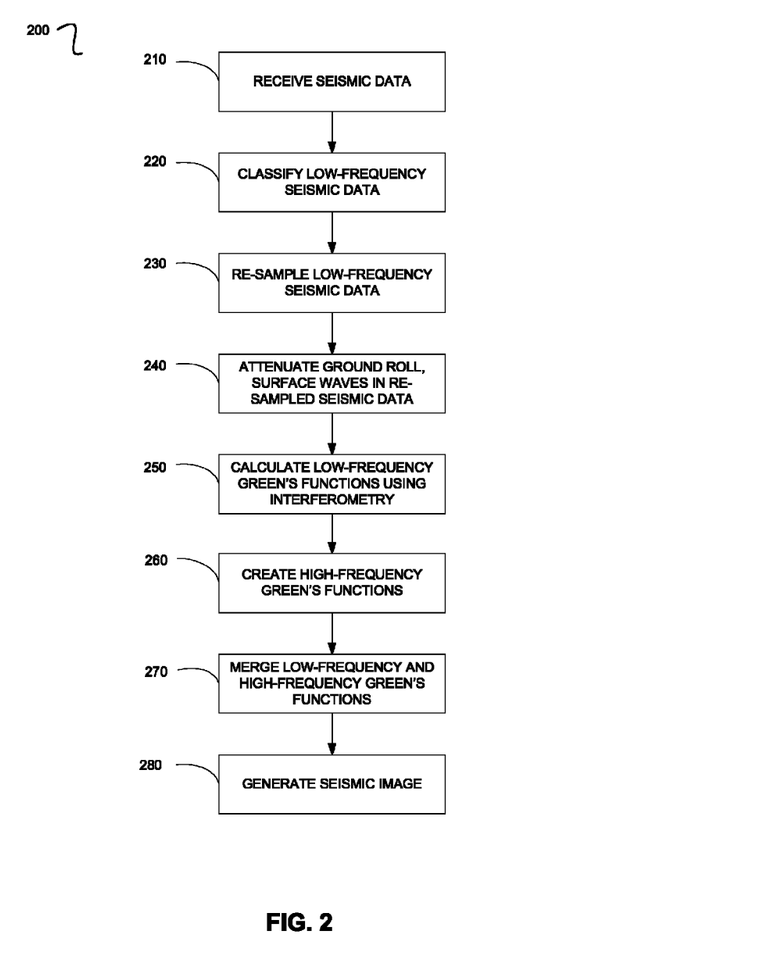
FIG. 2 illustrates a flow chart of a method for generating a seismic image of the subsurface in accordance with implementations described herein.

FIG. 2 illustrates a flow chart of a method 200 for generating a seismic image of the subsurface 105 in accordance with implementations described herein. It should be understood that while the flow chart indicates a particular order of execution, in some implementations, certain operations of method 200 may be executed in a different order.

At step 210, the seismic data may be received from two sensors in a seismic survey. The seismic data resulting from the combination of active and passive surveying may include a broad spectrum of low and high-frequency acoustic waves.

At step 220, low-frequency seismic data may be classified. In one implementation, all seismic data that is below and equal to 5 Hz may be classified as low-frequency seismic data. While 5 Hz is used as an example here, it should be understood that other predetermined frequencies may instead be used to distinguish low-frequency seismic data. Herein, the predetermined frequency is referred to as fmin.

Further, the seismic data at the fmin, e.g., 5 Hz, may be classified as both high and low-frequency. In implementations of various techniques described herein, the seismic data that overlaps between high and low-frequency may be used to generate a velocity model. The velocity model generation is described in greater detail with reference to FIG. 3.

At step 230, the low-frequency seismic data may be re-sampled based on the fmin. The amount of recorded seismic data may be computationally expensive. Therefore, in one implementation, a re-sampling of the low-frequency seismic data may be used to generate the seismic image.

The low-frequency seismic data may be re-sampled according to a time interval and a spatial interval. In other words, seismic data recorded at each time interval may be used in the re-sample. Similarly, seismic data recorded at each spatial interval may be used in the re-sample. The time interval may be based on the fmin and a Nyquist sampling theorem. In one implementation, the time interval, dt, may be determined according to the following formula:

$$dt < \frac{1}{2*fmin}$$

The spatial interval may be based on the fmin, a Nyquist sampling theorem, and the vmin. The vmin may represent the velocity of the ground roll. In one implementation, the spatial interval, dx, may be determined according to the following formula:

$$dx < \frac{vmin}{2*fmin}$$

Re-sampling seismic data in the low-frequencies may provide an advantage in the cross-line direction of the seismic data. Typically, ground roll in 3-dimensional seismic data may be attenuated only by invoking 2-dimensional (2-D) assumptions However, in implementations of the various techniques described herein, ground roll may be attenuated without invoking the 2-D assumptions. In one implementation, the attenuation may be optional.

At step 240, the ground roll and surface waves may be attenuated in the re-sampled low-frequency seismic data. Advantageously, at low-frequencies, the characteristic wavelength may be large. As the wavelength increases, the maximum distance between sensors may increase correspondingly.

At step 250, a set of low-frequency Green's functions may be calculated using interferometry on the attenuated low-frequency seismic data. The set of low-frequency Green's function may describe the impulse responses at a pair of sensors. In the implementation where attenuation is optional, the set of low-frequency Green's functions may be calculated using Interferometry on the re-sampled low-frequency seismic data. An example of the Green's function for two receivers at locations, $x_1$ and $x_2$ follows:

$(G(x1, x2,t)+G(x1, x2,-t))*a(t) \approx \Sigma(v(x1, -t)*v(x1, t))$
$(G(x1, x2,-t)+G(x1, x2,-t))*a(t) \approx \Sigma(v(x1,-t)*v(x2,t))$ Wapenaar, 2004, *Retrieving the Elastodynamic Green's Function of an Arbitrary Inhomogeneous Medium by Cross-Correlation*: 93 Phys. Rev. Lett., 254301 (2004)

where v are vertical component noise records recorded at locations $x_1$ and $x_2$; $G(x_1,x_2,t)$ may be the Green's function between locations $x_1$ and $x_2$ corresponding to a recorded particle velocity at $x_2$ and a vertical point force (impulse) at $x_1$; and a(t) may be the auto-correlation of the source time function of all noise records. Although implementations of various techniques have been described with reference to a continuous seismic recording, it should be understood that some implementations contemplate breaks or pauses between seismic recordings. Regardless, all records that are included in the sum come from the same locations and are recorded simultaneously across the sensors. Additionally, in one implementation, the formula above can be generalized to other source types and other recorded quantities such as horizontal components of particle velocity.

Interferometry is a means of constructing Green's functions between pairs of points. One sensor may be located at each of the points. For each pair of sensors in the attenuated low-frequency seismic data, a seismic data set may be produced for one of the pair. The seismic data set produced may represent reflected waves from a virtual source. In other words, the other of the pair is treated as the source. The full set of seismic data produced for every sensor pair is referred to herein as an interferometric reflection seismic data set.

At step 260, high frequency seismic data may be processed to create a set of high-frequency Green's functions. The high-frequency seismic data may be from the active seismic survey data that is at or above the fmin described above.

At step 270, the set of low-frequency Green's functions may be merged with the set of high-frequency Green's functions. By merging the low and high frequencies, a set of broad-band Green's functions may be created.

In one implementation, a regularization process may be used to perform the merger. The regularization process may interpolate the virtual source locations of the set of low-frequency Green's functions to locations of actual sources in the set of high-frequency Green's functions. The overlapping data in the fmin frequency band may also be used to tie and calibrate the sets of high and low-frequency Green's functions to each other.

At step 280, a seismic image may be generated of the subsurface 105. The image may be generated using the set of broad-band Green's functions. The set of broad-band Green's functions may be used to generate a velocity model of the subsurface 105.

In one implementation, the velocity model may be generated using a full waveform inversion procedure. The full waveform inversion procedure may be an iterative process that uses a range of frequencies within the set of broad-band Green's functions to produce the velocity model. A low-frequency may be selected within the set of broad-band Green's functions. Seismic data at the selected frequency may be inverted to generate a low-resolution model that fits the seismic data at the selected frequency.

A higher frequency may then be selected. The seismic data at the higher frequency may then be inverted with the low-resolution velocity model to generate a higher resolution model. The process may then be repeated, using seismic data from progressively higher frequencies and each progressively generated model, until a velocity model of desired resolution may be generated.

To generate the seismic image, the set of high-frequency Green's functions may be imaged by performing a reverse time migration using the velocity model and the set of high-frequency Green's functions.

Figure 3:
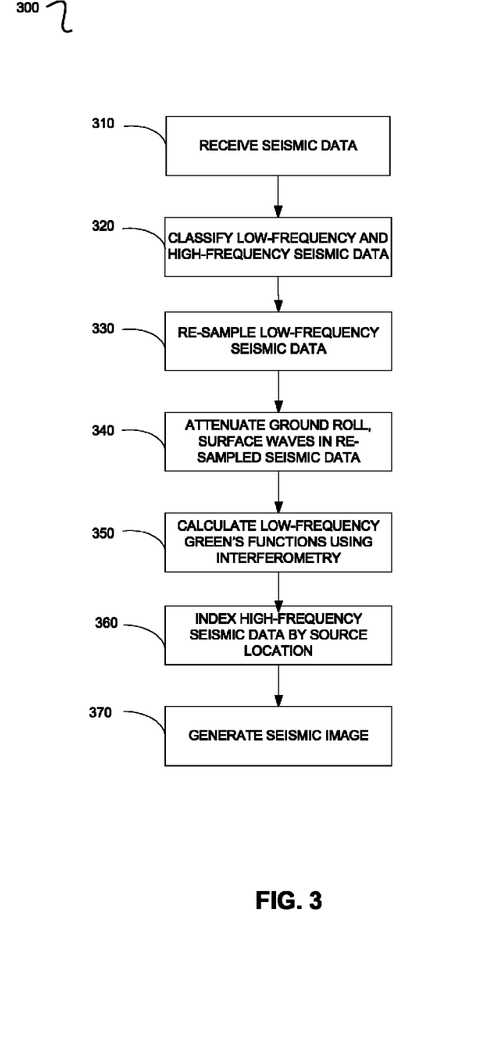
FIG. 3 illustrates a flow chart of a method for generating a velocity model of the subsurface in accordance with implementations of the various techniques described herein.

FIG. 3 illustrates a flow chart of a method 300 for generating a seismic image of the subsurface 105 in accordance with implementations of the various techniques described herein. It should be understood that while the flow chart indicates a particular order of execution, in some implementations, certain operations of method 300 may be executed in a different order.

With exception to step 320, steps 310-350 of method 300 are the same as steps 210-250 described with reference to method 200. However at step 320, in addition to the classification of low-frequency seismic data, a classification of high-frequency seismic data is also performed. Seismic data that is at or above the fmin is classified as the high-frequency seismic data.

At step 360, the high-frequency seismic data may be indexed by the locations of the sources of the high-frequency seismic data. The sources may be the sources of the active surveying. The indexed data is referred to herein as an active source seismic dataset.

A step 370, a seismic image may be generated using the active source seismic dataset and the set of low-frequency Green's functions. In one implementation, the seismic image is generated by performing the full waveform inversion described above. Alternatively, the seismic image may be generated using a prestack depth migration, or an impedance inversion.

Figure 4:
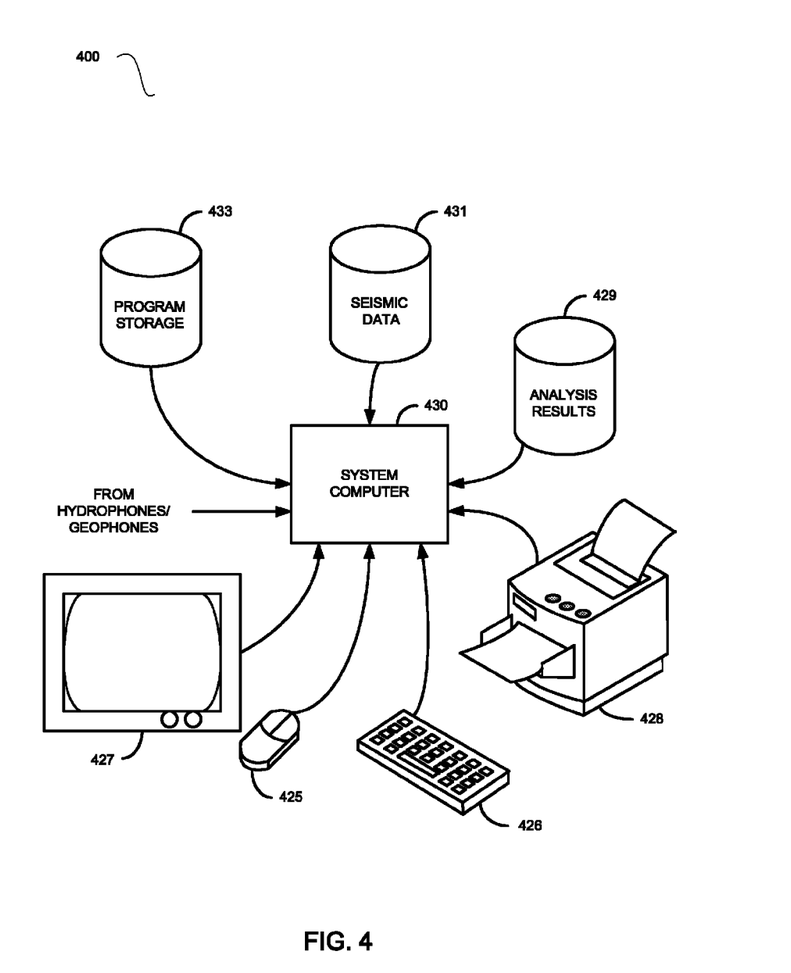
FIG. 4 illustrates a computer network into which implementations of various technologies described herein may be implemented.

FIG. 4 illustrates a computing system 400, into which implementations of various technologies described herein may be implemented. The computing system 400 may include one or more system computers 430, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the sensors may be stored in disk storage device 431. The system computer 430 may retrieve the appropriate data from the disk storage device 431 to process seismic data according to program instructions that correspond to implementations of various technologies described herein.

The program instructions may be written in a computer programming language, such as C++, Java and the like. The program instructions may be stored in a computer-readable medium, such as program disk storage device 433. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 430.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 430 may present output primarily onto graphics display 427, or alternatively via printer 428. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the sensors (either directly or via a recording unit, not shown), to receive signals indicative of the reflected seismic energy. These signals, after conventional formatting and other initial processing, may be stored by the system computer 430 as digital data in the disk storage 431 for subsequent retrieval and processing in the manner described above.

While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   receiving the seismic data from two sensors in a seismic survey;
   classifying the seismic data below and equal to a predetermined frequency as low-frequency seismic data;
   calculating a set of low-frequency Green's functions using interferometry on the low-frequency seismic data;
   processing high-frequency seismic data of the seismic data to create a set of high-frequency Green's functions at one or more source locations of the seismic survey;
   merging the set of low-frequency Green's functions and the set of high-frequency Green's functions to create a set of broad-band Green's functions at the source locations; and
   generating a seismic image using the set of broad-band Green's functions.

2. The method of claim 1, further comprising attenuating ground roll and surface waves in the low-frequency seismic data.

3. The method of claim 1, wherein the set of low-frequency Green's functions comprises one or more reflection seismic data based on one or more cross-correlations between the two sensors, and wherein one of the two sensors is configured as a source of the reflection seismic data.

4. The method of claim 1, wherein the seismic data is classified using a low pass filter.

5. The method of claim 1, wherein generating the seismic image comprises:
producing a velocity model based on the set of broad-band Green's functions; and
imaging the set of high-frequency Green's functions using the velocity model.

6. The method of claim 5, wherein imaging the set of high-frequency Green's functions comprises performing a reverse time migration using the velocity model and the set of high-frequency Green's functions.

7. The method of claim 1, wherein the predetermined frequency ranges from about 4 Hz to about 5 Hz.

8. The method of claim 1, wherein the seismic data are obtained through continuous recording for the seismic data and surrounding noise.

9. The method of claim 8, wherein the surrounding noise comprises environmental noise at a surface of the earth.

10. The method of claim 8, wherein the surrounding noise comprises noise from earthquake, oceans or both.

11. The method of claim 1, further comprising re-sampling the low-frequency seismic data based on the predetermined frequency, and wherein the set of low-frequency Green's functions is calculated using Interferometry on the re-sampled low-frequency seismic data.

12. The method of claim 11, wherein the low-frequency seismic data are re-sampled according to a time interval and a spatial interval based on the predetermined frequency, and a Nyquist sampling theorem.

13. The method of claim 12, wherein the Nyquist sampling theorem specifies that the spatial interval is less than $v*(2*f)^{-1}$, where v=the ground velocity in the recorded seismic data and f=the predetermined frequency.

14. A method for processing seismic data comprising:
receiving the seismic data from two sensors in a seismic survey;
classifying the seismic data above and equal to a predetermined frequency as high-frequency seismic data and below and equal to the predetermined frequency as low-frequency seismic data;
re-sampling the low-frequency seismic data based on the predetermined frequency;
calculating a set of low-frequency Green's functions using interferometry on the re-sampled low-frequency seismic data;
processing the high-frequency seismic data to form a set of high-frequency Green's functions at one or more source locations of the seismic survey;
merging the set of low-frequency Green's functions with the set of high-frequency Green's functions to generate a set of broad-band Green's functions at the source locations; and
inverting for one or more subsurface parameters using the set of broad-band Green's functions.

15. The method of claim 14, wherein the set of low-frequency Green's functions comprises one or more reflection seismic data based on one or more cross-correlations between the two sensors, and wherein one of the two sensors is configured as a source of the reflection seismic data.

16. The method of claim 14, wherein merging the set of low-frequency Green's functions with the set of high-frequency Green's functions comprises calibrating the set of low-frequency Green's functions with the set of high-frequency Green's functions at the predetermined frequency where the low-frequency seismic data and the high-frequency seismic data overlap.

17. The method of claim 16, wherein calibrating the set of low-frequency Green's functions comprises: interpolating one or more virtual source locations in the set of low-frequency Green's functions to one or more locations of actual sources used to record the high-frequency seismic data.

18. A system, comprising:
a processor; and
a memory having program instructions configured to cause the processor to:
receive seismic data obtained through continuous recording for the seismic data and surrounding noise by one or more seismic sensors;
classify, using a low pass filter, the seismic data above and equal to a predetermined frequency as high-frequency seismic data and below and equal to the predetermined frequency as low-frequency seismic data;
re-sample the low-frequency seismic data based on the predetermined frequency;
attenuate ground roll and surface waves in the re-sampled low-frequency seismic data;
calculate a set of low-frequency Green's functions using interferometry on the attenuated low-frequency seismic data;
index the high-frequency seismic data by one or more sources of the high-frequency seismic data to generate an active source seismic dataset; and
generate a seismic image using the active source seismic dataset and the set of low-frequency Green's functions at one or more locations of the seismic sensors.

19. The system of claim 18, wherein the image is generated using a full waveform inversion on the active source seismic data set.

20. The system of claim 18, wherein the image is generated using a prestack depth migration on the active source seismic data set.

21. The system of claim 18, wherein the image is generated using an impedance inversion on the active source seismic data set.

* * * * *